(12) United States Patent
Brickell

(10) Patent No.: US 7,490,070 B2
(45) Date of Patent: Feb. 10, 2009

(54) APPARATUS AND METHOD FOR PROVING THE DENIAL OF A DIRECT PROOF SIGNATURE

(75) Inventor: Ernest F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/866,252

(22) Filed: Jun. 10, 2004

(65) Prior Publication Data

US 2006/0010079 A1 Jan. 12, 2006

(51) Int. Cl.
G06F 17/60 (2006.01)
(52) U.S. Cl. .............................. 705/75; 705/50; 705/51; 713/176
(58) Field of Classification Search .................. 705/75, 705/50, 51; 713/176
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | 711/166 |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen | |

(Continued)

FOREIGN PATENT DOCUMENTS

DE 4217444 12/1992

(Continued)

OTHER PUBLICATIONS

Berg, Cliff, "How Do I Create a Signed Applet?", *Dr. Dobb's Journal*, (Aug. 1997), 1-9.

(Continued)

*Primary Examiner*—Pierre E Elisca
(74) *Attorney, Agent, or Firm*—Blakely, Sokoloff, Taylor & Zafman LLP

(57) ABSTRACT

In some embodiments, a method and apparatus for proving the denial of a direct proof signature are described. In one embodiment, a trusted hardware device convinces a verifier that the trusted hardware device possesses cryptographic information without revealing unique, device identification information of the trusted hardware device or the cryptographic information. Once the verifier is convinced that the hardware device possesses the cryptographic information, the verifier may issue a denial of signature request to the trusted hardware device, including at least one compromised direct proof signature. In response, the trusted hardware device issues a denial of the compromised direct proof signature by proving to the verifier that a cryptographic key held by the trusted hardware device was not used to form the at least one compromised direct proof signature. Other embodiments are described and claims.

39 Claims, 9 Drawing Sheets

U.S. PATENT DOCUMENTS

| | | | |
|---|---|---|---|
| 4,521,852 A | 6/1985 | Guttag | |
| 4,529,870 A * | 7/1985 | Chaum | 235/380 |
| 4,571,672 A | 2/1986 | Hatada et al. | |
| 4,621,318 A | 11/1986 | Maeda | |
| 4,759,064 A | 7/1988 | Chaum | |
| 4,795,893 A | 1/1989 | Ugon | |
| 4,802,084 A | 1/1989 | Ikegaya et al. | |
| 4,825,052 A | 4/1989 | Chemin et al. | |
| 4,843,541 A | 6/1989 | Bean et al. | |
| 4,907,270 A | 3/1990 | Hazard | |
| 4,907,272 A | 3/1990 | Hazard | |
| 4,910,774 A | 3/1990 | Barakat | |
| 4,974,159 A | 11/1990 | Hargrove et al. | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | 711/164 |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Hotley et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,528,231 A | 6/1996 | Patarin | |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,628,023 A | 5/1997 | Bryant et al. | |
| 5,631,961 A * | 5/1997 | Mills et al. | 380/286 |
| 5,633,929 A | 5/1997 | Kaliski, Jr. | |
| 5,657,445 A | 8/1997 | Pearce | |
| 5,668,971 A | 9/1997 | Neufeld | |
| 5,680,547 A | 10/1997 | Chang | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | 711/163 |
| 5,740,178 A | 4/1998 | Jacks et al. | |
| 5,752,046 A | 5/1998 | Oprescu et al. | |
| 5,757,918 A | 5/1998 | Hopkins | |
| 5,757,919 A | 5/1998 | Herbert et al. | |
| 5,764,969 A | 6/1998 | Kahle | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,815,665 A | 9/1998 | Teper et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,138,239 A | 10/2000 | Veil | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | 713/200 |
| 6,252,650 B1 | 6/2001 | Nakaumra | |
| 6,269,392 B1 | 7/2001 | Cotichini et al. | |
| 6,272,533 B1 | 8/2001 | Browne | 709/213 |
| 6,272,637 B1 | 8/2001 | Little et al. | 713/194 |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | 711/153 |

| | | | | | |
|---|---|---|---|---|---|
| 6,301,646 B1 | 10/2001 | Hostetter | 2005/0283586 A1 | 12/2005 | Mondal et al. |
| 6,308,270 B1 | 10/2001 | Guthery et al. | | | |
| 6,314,409 B2 | 11/2001 | Schneck et al. | FOREIGN PATENT DOCUMENTS | | |
| 6,321,314 B1 | 11/2001 | Van Dyke | | | |
| 6,327,652 B1 | 12/2001 | England et al. | EP | 0473913 | 3/1992 |
| 6,330,670 B1 | 12/2001 | England et al. | EP | 0 492 692 | 7/1992 |
| 6,339,815 B1 | 1/2002 | Feng | EP | 0600112 | 6/1994 |
| 6,339,816 B1 | 1/2002 | Bausch | EP | 0602867 | 6/1994 |
| 6,357,004 B1 | 3/2002 | Davis | EP | 0892521 | 1/1999 |
| 6,363,485 B1 | 3/2002 | Adams | EP | 0930567 | 7/1999 |
| 6,374,286 B1 | 4/2002 | Gee et al. | EP | 0961193 | 12/1999 |
| 6,374,317 B1 | 4/2002 | Ajanovic et al. ............ 710/105 | EP | 0965902 | 12/1999 |
| 6,378,068 B1 | 4/2002 | Foster | EP | 1030237 | 8/2000 |
| 6,378,072 B1 | 4/2002 | Collins et al. | EP | 1055989 | 11/2000 |
| 6,389,537 B1 | 5/2002 | Davis et al. | EP | 1056014 | 11/2000 |
| 6,397,242 B1 | 5/2002 | Devine et al. | EP | 1085396 | 3/2001 |
| 6,397,379 B1 | 5/2002 | Yates, Jr. et al. | EP | 1146715 | 10/2001 |
| 6,412,035 B1 | 6/2002 | Webber | EP | 1209563 | 5/2002 |
| 6,421,702 B1 | 7/2002 | Gulick | EP | 1271277 | 1/2003 |
| 6,435,416 B1 | 8/2002 | Slassi | FR | 2 620 248 | 3/1989 |
| 6,445,797 B1 | 9/2002 | McGough et al. | FR | 2 700 430 | 7/1994 |
| 6,463,535 B1 | 10/2002 | Drews et al. | FR | 2 714 780 | 7/1995 |
| 6,463,537 B1 | 10/2002 | Tello | FR | 2 742 618 | 6/1997 |
| 6,473,508 B1 | 10/2002 | Young et al. | FR | 2 752 122 | 2/1998 |
| 6,473,800 B1 | 10/2002 | Jerger et al. | FR | 2 763 452 | 11/1998 |
| 6,496,847 B1 | 12/2002 | Bugnion et al. | FR | 2 830 147 | 3/2003 |
| 6,499,123 B1 | 12/2002 | McFarland et al. | JP | 2000076139 | 3/2000 |
| 6,505,279 B1 | 1/2003 | Phillips et al. | JP | 2006293472 | * 10/2006 |
| 6,507,904 B1 | 1/2003 | Ellison et al. | WO | WO9524696 | 9/1995 |
| 6,529,909 B1 | 3/2003 | Bowman-Amuah | WO | WO9729567 | 8/1997 |
| 6,535,988 B1 | 3/2003 | Poisner | WO | WO9812620 | 3/1998 |
| 6,557,104 B2 | 4/2003 | Vu et al. | WO | WO9834365 | 8/1998 |
| 6,560,627 B1 | 5/2003 | McDonald et al. | WO | WO9844402 | 10/1998 |
| 6,609,199 B1 | 8/2003 | DeTreville | WO | WO9905600 | 2/1999 |
| 6,615,278 B1 | 9/2003 | Curtis | WO | WO9918511 | 4/1999 |
| 6,633,963 B1 | 10/2003 | Ellison et al. | WO | WO9957863 | 11/1999 |
| 6,633,981 B1 | 10/2003 | Davis | WO | WO9965579 | 12/1999 |
| 6,651,171 B1 | 11/2003 | England et al. | WO | WO0021238 | 4/2000 |
| 6,678,825 B1 | 1/2004 | Ellison et al. | WO | WO0062232 | 10/2000 |
| 6,684,326 B1 | 1/2004 | Cromer et al. | WO | WO0127723 | 4/2001 |
| 6,988,250 B1 | 1/2006 | Proudler et al. | WO | WO0127821 | 4/2001 |
| 7,028,149 B2 | 4/2006 | Grawrock et al. | WO | WO0163994 | 8/2001 |
| 7,133,990 B2 | 11/2006 | Link et al. | WO | WO0175565 | 10/2001 |
| 7,165,181 B2 | 1/2007 | Brickell | WO | WO0175595 | 10/2001 |
| 2001/0021969 A1 | 9/2001 | Burger et al. | WO | WO0201794 | 1/2002 |
| 2001/0027511 A1 | 10/2001 | Wakabayashi et al. | WO | WO9909482 | 1/2002 |
| 2001/0027527 A1 | 10/2001 | Khidekel et al. | WO | WO0217555 | 2/2002 |
| 2001/0037450 A1 | 11/2001 | Metlitski et al. | WO | WO02060121 | 8/2002 |
| 2002/0004900 A1 | 1/2002 | Patel et al. | WO | WO0175564 | 10/2002 |
| 2002/0007456 A1 | 1/2002 | Peinado et al. | WO | WO02086684 | 10/2002 |
| 2002/0023032 A1 | 2/2002 | Pearson et al. | WO | WO03058412 | 7/2003 |
| 2002/0147916 A1 | 10/2002 | Strongin et al. | | | |
| 2002/0166061 A1 | 11/2002 | Falik et al. | | | |
| 2002/0169717 A1 | 11/2002 | Challener | | | |
| 2003/0002668 A1 | 1/2003 | Graunke et al. | OTHER PUBLICATIONS | | |
| 2003/0018892 A1 | 1/2003 | Tello | | | |
| 2003/0074548 A1 | 4/2003 | Cromer et al. | Brands, Stefan , "Restrictive Blinding of Secret-Key Certificates", | | |
| 2003/0112008 A1 | 6/2003 | Hennig | *Springer-Verlag* XP002201306, (1995),Chapter 3. | | |
| 2003/0115453 A1 | 6/2003 | Grawrock | Chien, Andrew A., et al., "Safe and Protected Execution for the | | |
| 2003/0126442 A1 | 7/2003 | Glew et al. | Morph/AMRM Reconfigurable Processor", *7th Annual IEEE Sym-* | | |
| 2003/0126453 A1 | 7/2003 | Glew et al. | *posium, FCCM '99 Proceedings,* XP010359180, ISBN 0-7695- | | |
| 2003/0159056 A1 | 8/2003 | Cromer et al. | 0375-6, Los Alamitos, CA, (Apr. 21, 1999),209-221. | | |
| 2003/0188156 A1 | 10/2003 | Yasala et al. | Compaq Computer Corporation, "Trusted Computing Platform Alli- | | |
| 2003/0188179 A1 | 10/2003 | Challener et al. | ance (TCPA) Main Specification Version 1.1a", XP002272822, (Jan. | | |
| 2003/0195857 A1* | 10/2003 | Acquisti ....................... 705/74 | 25, 2001),1-321. | | |
| 2003/0196085 A1 | 10/2003 | Lampson et al. | Coulouris, George , et al., "Distributed Systems, Concepts and | | |
| 2003/0231328 A1 | 12/2003 | Chapin et al. | Designs", *2nd Edition*, (1994),422-424. | | |
| 2003/0235175 A1 | 12/2003 | Naghiam et al. | Crawford, John , "Architecture of the Intel 80386", *Proceedings of* | | |
| 2004/0003324 A1 | 1/2004 | Uhlig et al. | *the IEEE International Conference on Computer Design: VLSI in* | | |
| 2004/0117539 A1 | 6/2004 | Bennett et al. | *Computers and Processors (ICCD '86),* (Oct. 6, 1986),155-160. | | |
| 2004/0123288 A1 | 6/2004 | Bennette et al. | Davida, George I., et al., "Defending Systems Against Viruses | | |
| 2004/0260926 A1* | 12/2004 | Arditti Modiano et al. .. 713/170 | through Cryptographic Authentication", *Proceedings of the Sympo-* | | |
| 2005/0010535 A1* | 1/2005 | Camenisch .................. 705/74 | *sium on Security and Privacy*, IEEE Comp. Soc. Press, ISBN 0-8186- | | |
| | | | 1939-2,(May 1989). | | |

Fabry, R.S., "Capability-Based Addressing", Fabry, R.S., "Capability-Based Addressing," *Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Goldberg, Robert P., "Survey of Virtual Machine Research", *Computer Magazine*, (Jun. 1974),34-35.

Gong, Li, et al., "Going Behind the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe, "MIPS R4000 Microprocessor User's Manual, Second Edition", *Chapter 4 "Memory Management"*, (Jun. 11, 1993),61-97.

HP Mobile Security Overview, "HP Mobile Security Overview", (Sep. 2002),1-10.

IBM, "Information Display Technique for a Terminate Stay Resident Program IBM Technical Disclosure Bulletin", *TDB-ACC-No. NA9112156*, vol. 34, Issue 7A, (Dec. 1, 1991),156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel, "IA-32 Intel Architecture Software Developer's Manual", vol. 3: *System Programming Guide*, Intel Corporation—2003,13-1 through 13-24.

Intel, "Intel386 DX Microprocessor 32-Bit CHMOS Microprocessor With Integrated Memory Management", (1995),5-56.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990)2-19.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin, et al., "Running Multiple Operating Systems Concurrently on an IA32 PC Using Virtualization Techniques", http://www.plex86.org/research/paper.txt, (Nov. 29, 1999),1-31.

Luke, Jahn, et al., "Replacement Strategy for Aging Avionics Computers", *IEEE AES Systems Magazine*, XP002190614,(Mar. 1999).

Menezes, Alfred J., et al., "Handbook of Applied Cryptography", *CRC Press Series on Discrete Mathematices and its Applications*, Boca Raton, FL, XP002165287, ISBN 0849385237,(Oct. 1996),403-405, 506-515, 570.

Menezes, Alfred J., et al., "Handbook of Applied Cryptography", *CRC Press LLC*, USA XP002201307, (1997),475.

Motorola, "M68040 User's Manual", (1993),1-1 to 8-32.

Nanba, S., et al., "VM/4: ACOS-4 Virtual Machine Architecture", *VM/4: ACOS-4 Virtual Machine Architecture, IEEE*, (1985),171-178.

Richt, Stefan, et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M., "Virtual Platform: A Virtual Machine Monitor for Commodity PC", *Proceedings of the 11th Hotchips Conference*, (Aug. 17, 1999),185-196.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio, et al., "A Hardware Scheduler for Complex Real-Time Systems", *Proceedings of the IEEE International Symposium on Industrial Electronics*, XP002190615,(Jul. 1999),43-48.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", *2nd Edition: Wiley, John & Sons, Inc.*, XP002251738; ISBN 0471128457,(Nov. 1995),28-33; 176-177; 216-217; 461-473; 518-522.

Sherwood, Timothy, et al., "Patchable Instruction ROM Architecture", *Department of Computer Science and Engineering*, University of California, San Diego, La Jolla, CA, (Nov. 2001).

Ateniese, Giuseppe et al. "A Practical and Provably Secure Coalition-Resistant Group Signature Scheme", *Advances in Cryptology—CRYPTO2000*, vol. 1880 of *Lecture Notes in Computer Science* pp. 255-270 Int'l Assoc. for Crypt Res. Spring-Verlag Berlin Germany 2000.

Menezes, Vanston, Oorschot: "Handbook of Applied Cryptography", CRC Press, LLC, USA 1997, pp. 405-406, 409-410, 433-435 and 576-580. XP002353062.

Internation Preliminaty Report on Patentability of International Application No. PCT/US2005/016559 mailed Dec. 29, 2006.

Hall, Judith S., et al., "Virtualizing the VAX Architecture," ACM SIGARCH Computer Architecture News, Proceedings of the 18th Annual International symposium on Computer Architecture, vol. 19, Issue No. 3, Apr. 1991, 10 pages.

Office Action for U.S. Appl. No. 10/185,123, dated Apr. 16, 2007, 10 pages.

Office Action for U.S. Appl. No. 10/663,206, dated Apr. 19, 2007, 11 pages.

Office Action for U.S. Appl. No. 10/814,569, dated Apr. 5, 2007, 5 pages.

PCT Search Report for PCT/US2005/01056, dated Aug. 22, 2006, 6 pages.

Rosenberg, Jonathan B., "How Debuggers Work (Algorithms, Data Structures, and Architecture," Chapters 3 and 5 Hardware Debugger Facilities, Wiley Computer Publishing, United States, 1996, pp. 42-43, 95, 96 and 99.

* cited by examiner

US 7,490,070 B2

APPARATUS AND METHOD FOR PROVING THE DENIAL OF A DIRECT PROOF SIGNATURE

FIELD OF THE INVENTION

One or more embodiments of the invention relate generally to the field of cryptography. More particularly, one or more of the embodiments of the invention relates to a method and apparatus for proving the denial of a direct proof signature.

BACKGROUND OF THE INVENTION

For many modern communication systems, the reliability and security of exchanged information is a significant concern. To address this concern, the Trusted Computing Platform Alliance (TCPA) developed security solutions for platforms. In accordance with a TCPA specification entitled "Main Specification Version 1.1b," published on or around Feb. 22, 2002, each personal computer (PC) is implemented with a trusted hardware device referred to as a Trusted Platform Module (TPM). Each TPM contains a unique endorsement key pair (EK), which features a public EK key (PUBEK) and a private EK key (PRIVEK). The TPM typically has a certificate for the PUBEK signed by the manufacturer.

During operation, an outside party (referred to as a "verifier") may require authentication of the TPM. This creates two opposing security concerns. First, the verifier needs to be sure that requested authentication information is really coming from a valid TPM. Second, an owner of a PC including the TPM wants to maintain as much privacy as possible. In particular, the owner of the PC wants to be able to provide authentication information to different verifiers without those verifiers being able to determine that the authentication information is coming from the same TPM.

One proposed solution to these security issues is to establish a Trusted Third Party (TTP). For instance, the TPM would create an Attestation Identify Key pair (AIK), namely a public AIK key and a private AIK key. The public AIK key could be placed in a certificate request signed with the PRIVEK, and subsequently sent to the TTP. The certificate for the PUBEK would also be sent to the TTP. Once the certificates are received, the TTP would check that the signed certificate request is valid, and if valid, the TTP would issue a certificate to the TPM.

Once a certificate is issued, the TPM would then use the public AIK and the TTP issued certificate when the TPM received a request from a verifier. Since the AIK and certificate would be unrelated to the EK, the verifier would get no information about the identity of the TPM or PC implemented with the TPM. In practice, the above-identified approach is problematic because it requires TTPs to be established. Identifying and establishing various parties that can serve as TTPs has proven to be a substantial obstacle.

Another proposed solution is set forth in a co-pending U.S. application Ser. No. 10/306,336, filed Nov. 27, 2002, which is also owned by the assignee of the present application. The proposed solution utilizes a direct proof method whereby the TPM could prove directly without requiring a trusted third party that an AIK has been created by a valid TPM without revealing the identity of the TPM. In that solution, each TPM has a unique private key. Unfortunately, an adversary may take a TPM and, using sophisticated means, extract the unique private key from the TPM.

In the Direct Proof method, there is a method given to be able to revoke a key that has been removed from a TPM. During the Direct Proof protocol, the TPM gets a base, h, and computes and reveals $k=h^f \mod n$, where n is part of the public key, and f is part of the unique key held by the TPM. So if a verifier receives a value f0 that has been removed from a TPM, the verifier can check whether the Direct Proof was created using this value f0, by performing the computation $k0=h^{f0} \mod n$, and checking to see if $k=k0$. For if $k=k0$, then the Direct Proof was created using f0, and if k is not equal to k0, then the Direct Proof was created using some other private key.

One limitation of this method is that it requires that the verifier obtain the value of f0. It is conceivable that the adversary could have obtained the secret unique value from a TPM, and used it in a way that the verifier could not obtain the value of f0, but could know that for a particular k0, that value of f0 had been removed from the TPM. In U.S. application Ser. No. 10/306,336, one method was presented for dealing with this problem. It required the verifier to provide the value of the base h for each TPM to use when interacting with that verifier. This has the property that it allows the verifier to be able to link all interactions with that verifier.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
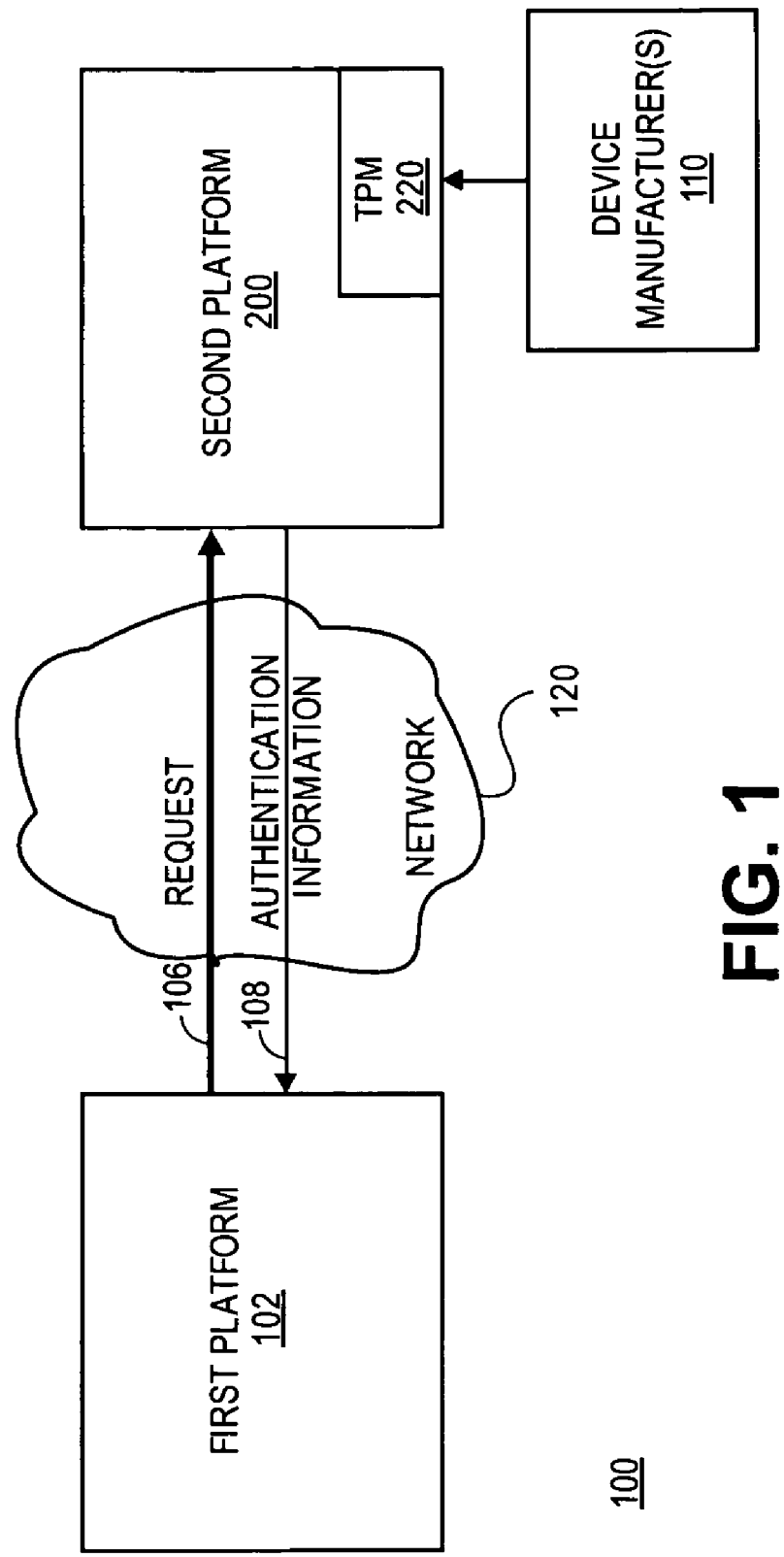
FIG. 1 illustrates a system featuring a platform implemented with a Trusted Platform Module (TPM) that operates in accordance with one embodiment.

A method and apparatus for proving the denial of a direct proof signature are described. In one embodiment a trusted hardware device convinces a verifier of possessing cryptographic information without revealing unique, device identification information of the trusted hardware device or the cryptographic information. This is accomplished without the use of a Trusted Third Party (TTP). Rather, it is accomplished by a "direct proof" methodology in which computations by the TPM involve exponentiations using a cryptographic key as an exponent. In one embodiment, the trusted hardware device proves to a verifier that a digital signature used in the direct proof ("direct proof signature") is based on an uncompromised cryptographic key.

In one embodiment, the verifier may issue a denial signature request to the trusted hardware device to prove that a cryptographic key held by the trusted hardware device was not used to form a direct proof signature suspected of being compromised (suspect direct proof signature). For one embodiment, the functionality of the TPM, which is configured to prove to a verifier that information (e.g., cryptographic key, digital signature, digital certificate, etc.) from the TPM is uncompromised, is deployed as firmware. However, it is contemplated that such functionality may be deployed as dedicated hardware or software. Instructions or code forming thee firmware or software are stored on a machine-readable medium.

Herein, "machine-readable medium" may include, but is not limited to a floppy diskette, hard disk, optical disk (e.g., CD-ROMs, DVDs, mini-DVDs, etc.), magneto-optical disk, semiconductor memory such as read-only memory (ROM), random access memory (RAM), any type of programmable read-only memory (e.g., programmable read-only memory "PROM", erasable programmable read-only memories "EPROM", electrically erasable programmable read-only memories "EEPROM", or flash), magnetic or optical cards, or the like. It is contemplated that a signal itself and/or a communication link can be regarded as machine-readable medium since software may be temporarily stored as part of a downloaded signal or during propagation over the communication link.

In the following description, certain terminology is used to describe certain features of one or more embodiments of the invention. For instance, "platform" is defined as any type of communication device that is adapted to transmit and receive information. Examples of various platforms include, but are not limited or restricted to computers, personal digital assistants, cellular telephones, set-top boxes, facsimile machines, printers, modems, routers, or the like. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

A "verifier" refers to any entity (e.g., person, platform, system, software, and/or device) that requests some verification of authenticity or authority from another entity. Normally, this is performed prior to disclosing or providing the requested information. A "prover" refers to any entity that has been requested to provide some proof of its authority, validity, and/or identity. A "device manufacturer," which may be used interchangeably with "certifying manufacturer," refers to any entity that manufactures or configures a platform or device (e.g., a Trusted Platform Module).

As used herein, to "prove" or "convince" a verifier that a prover has possession or knowledge of some cryptographic information (e.g., signature key, a private key, etc.) means that, based on the information and proof disclosed to the verifier, there is a high probability that the prover has the cryptographic information. To prove this to a verifier without "revealing" or "disclosing" the cryptographic information to the verifier means that, based on the information disclosed to the verifier, it would be computationally infeasible for the verifier to determine the cryptographic information. Such proofs are hereinafter referred to as direct proofs. The term "direct proof" refers to zero-knowledge proofs, as these types of proofs are commonly known in the field.

Throughout the description and illustration of the various embodiments discussed hereinafter, coefficients, variables, and other symbols (e.g., "h") are referred to by the same label or name. Therefore, where a symbol appears in different parts of an equation as well as different equations or functional description, the same symbol is being referenced.

I. General Architecture

FIG. 1 illustrates system 100 featuring a platform implemented with a trusted hardware device (referred to as "Trusted Platform Module" or "TPM") in accordance with one embodiment. A first platform 102 (Verifier) transmits an authentication request 106 to a second platform 200 (Prover) via network 120. In response to request 106, second platform 200 provides the authentication information 108. In one embodiment, network 120 forms part of a local or wide area network, and/or a conventional network infrastructure, such as a company's Intranet, the Internet, or other like network.

Additionally, for heightened security, first platform 102 may need to verify that prover platform 200 is manufactured by either a selected device manufacturer or a selected group of device manufacturers (hereinafter referred to as "device manufacturer(s) 110"). In one embodiment, first platform 102 challenges second platform 200 to show that it has cryptographic information (e.g., a private signature key) generated by device manufacturer(s) 110. Second platform 200 replies to the challenge by providing authentication information, in the form of a reply, to convince first platform 102 that second platform 200 has cryptographic information generated by device manufacturer(s) 110, without revealing the cryptographic information or any unique, device/platform identification information.

Figure 2:
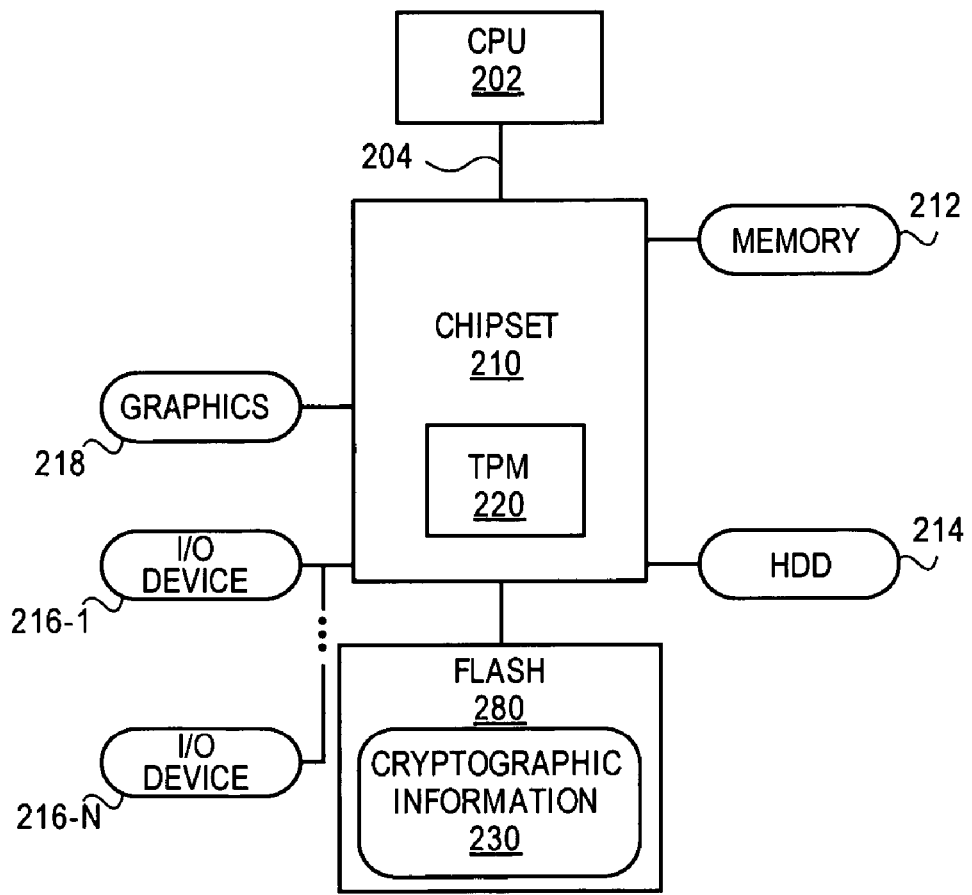
FIG. 2 illustrates a first embodiment of the platform including the TPM of FIG. 1.

FIG. 2 is a block diagram further illustrating platform 200 including TPM 220 to convince a verifier that platform 200 possesses uncompromised cryptographic information without disclosure of the cryptographic information or any unique device identification information. Representatively, computer system 200 comprises a processor system bus (front side bus (FSB)) 204 for communicating information between processor (CPU) 202 and chipset 210. As described herein, the term "chipset" is used in a manner to collectively describe the various devices coupled to CPU 202 to perform desired system functionality.

Representatively, graphics block 218 hard drive devices (HDD) 214 and main memory 212 may be coupled to chipset 210. In one embodiment, chipset 210 is configured to include a memory controller and/or an input/output (I/O) controller to communicate with I/O devices 216 (216-1, . . . , 216-N). In an alternate embodiment, chipset 210 is or may be configured to incorporate graphics block 218 and operate as a graphics memory controller hub (GMCH). In one embodiment, main memory 212 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

Figure 3:
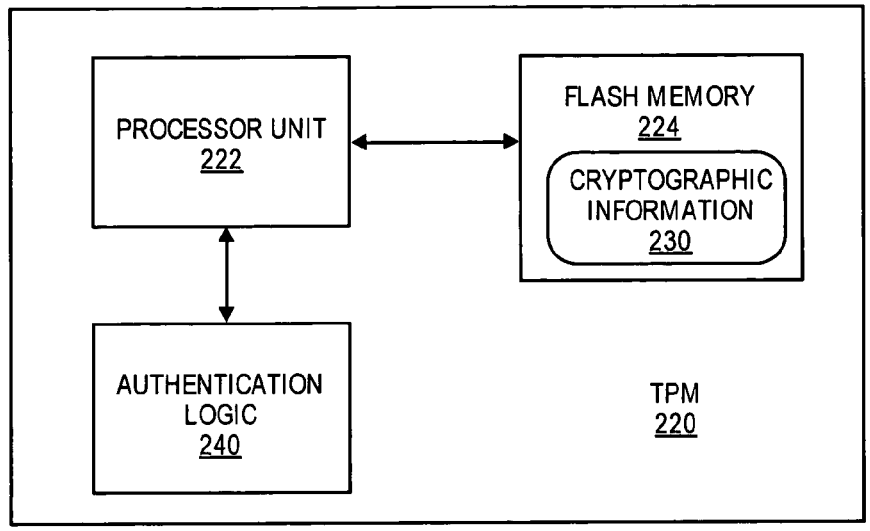
FIG. 3 illustrates a second embodiment of the platform including the TMP of FIG. 1.

FIG. 3 further illustrates Trusted Platform Module (TPM) 220 of second platform 200, in accordance with one embodiment. TPM 220 is a cryptographic device that is manufactured by device manufacturer(s) 110. In one embodiment, TPM 220 comprises processor unit 222 with a small amount of on-chip memory encapsulated within a package. In one embodiment, the encapsulated memory may be used to store cryptographic key 230 received from a certifying manufacturer. TPM 220 is configured to provide authentication information to first platform 102 that would enable it to determine that the authentication information is transmitted from a valid TPM. The authentication information used is non-unique data that would make it highly likely that the TPM's or second platform's identify can be determined, referred to herein as "unique, device identification information."

In one embodiment, TMP 220 further comprises non-volatile memory 224 (e.g., flash) to permit storage of cryptographic information such as one or more of the following: keys, hash values, signatures, certificates, etc. In one embodiment, the cryptographic information is a cryptographic key received from a certifying manufacturer. As shown below, a hash value of "X" may be represented as "Hash(X)". Of course, it is contemplated that such information may be stored within external memory 280 of platform 200 in lieu of flash memory 224. The cryptographic information may be encrypted, especially if stored outside TPM 220.

In one embodiment, TPM 220 includes authentication logic 240 to respond to an authentication request from a verifier platform. In one embodiment, authentication logic 240 convinces or proves to the verifier platform that TPM 220 has stored cryptographic information generated by a certifying device manufacturer, without revealing the cryptographic information or any unique device/platform identification information. As a result, authentication logic 240 performs the requested authentication while preserving the identity of the prover platform. Authentication logic 240 is further illustrated with reference to FIG. 4.

As illustrated, direct proof logic 250 is configured to engage in a direct proof, as described in further detail below, to convince a verifier that the prover platform contains the cryptographic information from a certifying manufacturer without revealing the cryptographic information. As described below, key logic 270 performs platform set-up of TPM 220 to receive a unique, secret private pair (c,F), where F is a private signature key, $F=c^e \mod n$, and e,n is a public key of a certifying manufacturer of TMP 220.

As described in further detail below, denial of signature logic 260 provides additional functionality described below to convince or prove to a verifier platform that a private signature key held by the device was not used to generate a suspect signature during a direct proof (suspect direct signature proof), as performed by direct proof logic 250. It is appreciated that a lesser or better equipped computer than described above may be desirable for certain implementations. Therefore, the configuration of platform 200 will vary from implementation to implementation depending upon numerous factors, such as price constraints, performance requirements, technological improvements, and/or other circumstances.

II. Platform Set-Up

A "platform family" may be defined by the device manufacturer to include one or more types of platforms or devices. For instance, a platform family may be the set of all platforms (members) that have the same security relevant information. This security relevant information could contain some of the information that is included in the EK or AIK certificate in the TCPA model. It could also include the manufacturer and model number of the particular platform or device. For each platform family, a device manufacturer creates the cryptographic parameters that the manufacturer uses for that platform family. The device manufacturer creates a signature key that it uses to sign the secrets for the devices (e.g., platform 200 or TPM 220) that it manufactures as shown in FIGS. 5-6.

Figure 5:
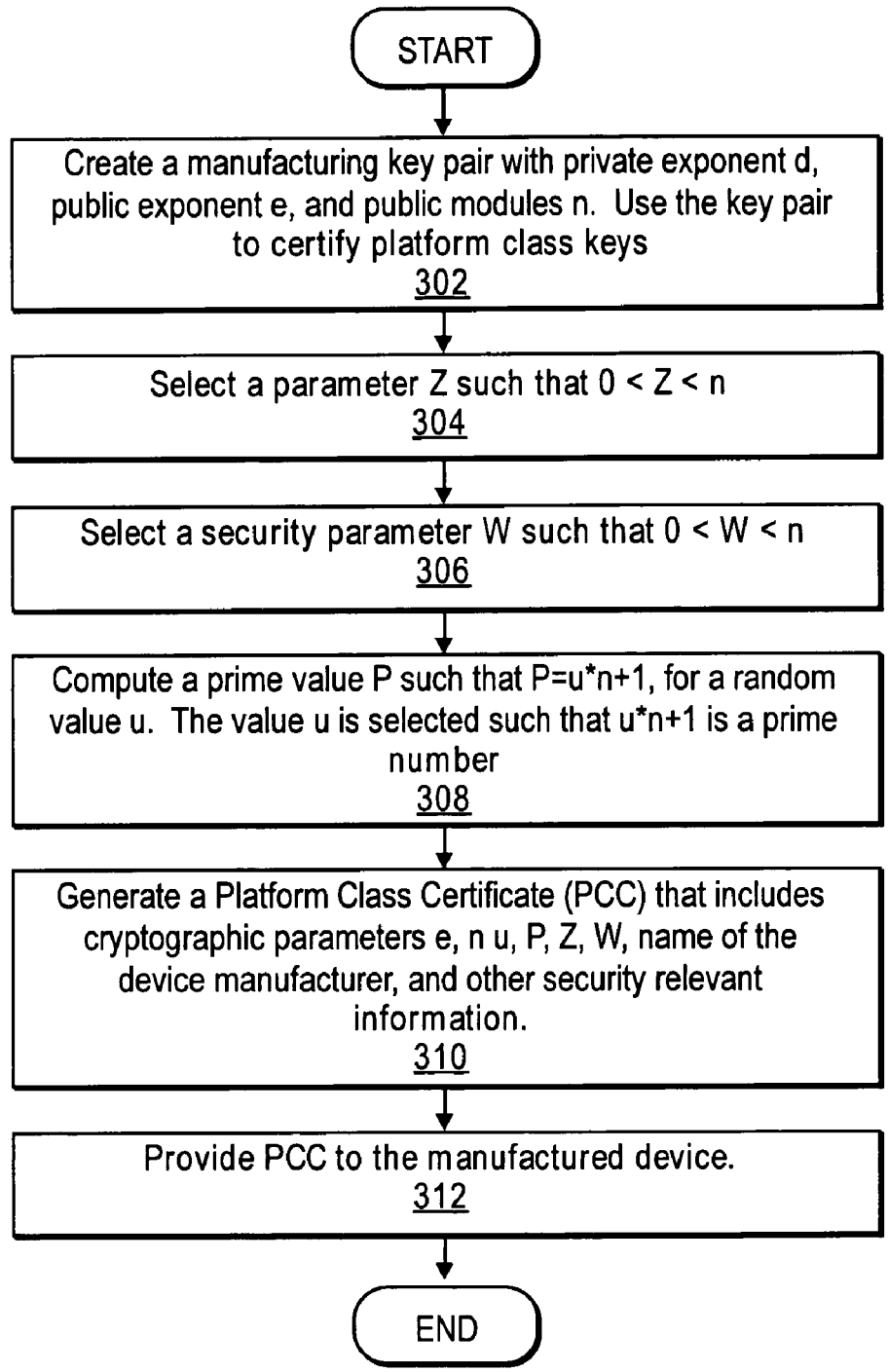
FIG. 5 illustrates a flow diagram of a procedure to setup a TPM during manufacturing according to one embodiment.
Figure 6:
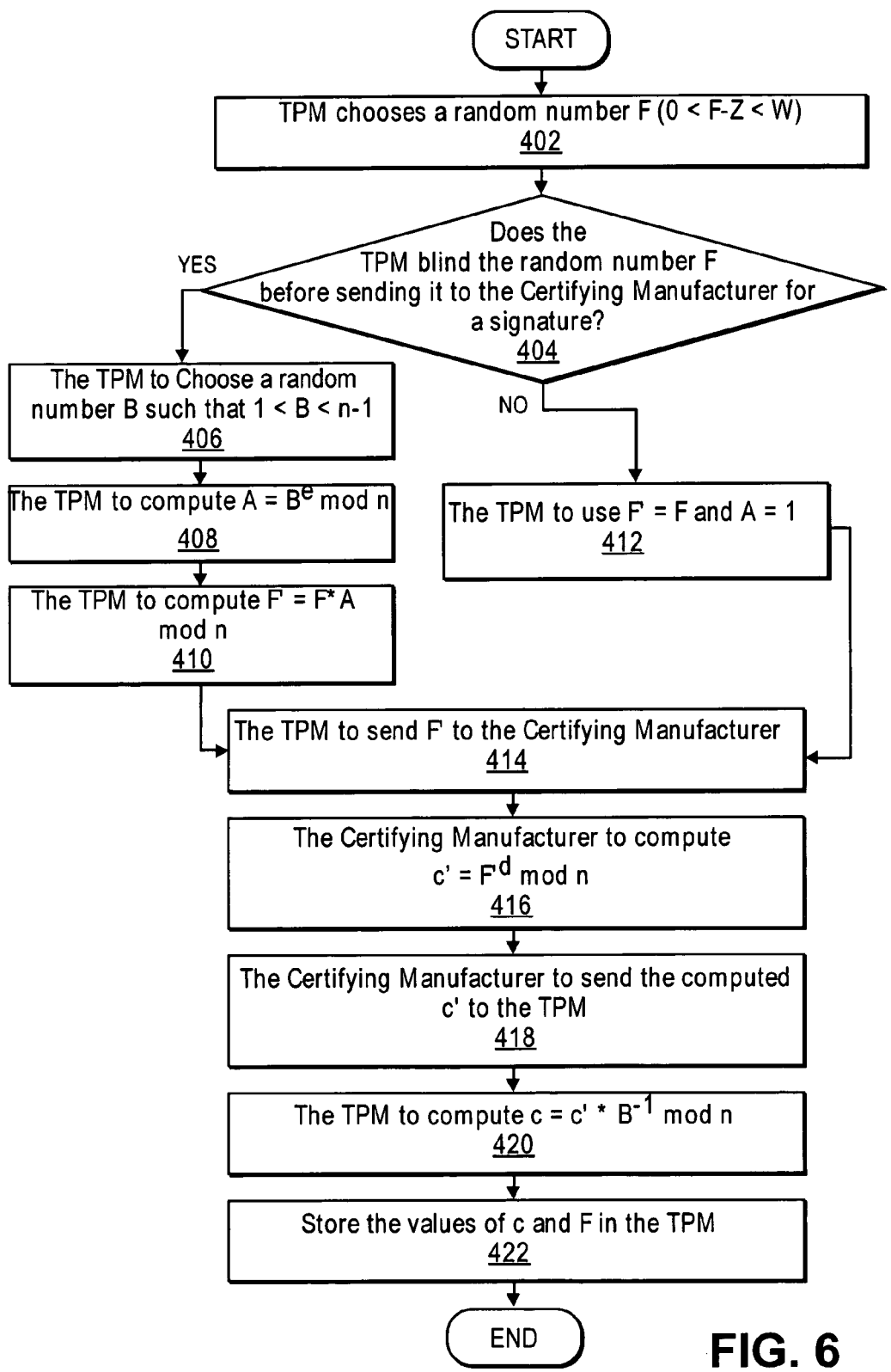
FIG. 6 illustrates a flow diagram of a procedure to setup each platform manufactured according to one embodiment.

FIG. 5 is a flowchart illustrating a method 400 to form a platform family certificate (PFC) in accordance with one embodiment. In one embodiment, the device manufacturer utilizes a public key cryptographic function (e.g., Rivest, Shamir and Adelman (RSA) function) to create an RSA public/private key pair with public modulus n, public exponent e, and private exponent d (block 402). The public key is based on values e,n while the private key is based on d,n. This can be created using well known methods, such as those described in *Applied Cryptography*, by Bruce Schneier, John Wiley & Sons; ISBN: 0471117099; Second Edition (1996). In one embodiment, modulus n should be chosen large enough so that it is computationally infeasible to factor n.

The device manufacturer specifies a parameter Z, which is an integer between zero (0) and n (block 404). The device manufacturer specifies a security parameter W, which is an integer between zero (0) and n (block 406). However, picking W too small or too large may introduce a security failure. In one embodiment of the invention, W is selected to be approximately $2^{160}$. Selecting W to be between $2^{80}$ and the square root of n is recommended. In one embodiment of the invention, the device manufacturer computes a prime number P, such that $P=u*n+1$ (block 408). Any value of u can be used as long as P is prime; however, to retain an acceptable level of security, the value P should be large enough so that computing a discrete logarithm "mod P" is computationally infeasible.

In one embodiment, the Direct Proof public key of the device manufacturer consists of the cryptographic parameters e,n,u,P,Z,W. These parameters will be used by a verifier to verify a direct proof signature created by a device. The device manufacturer generates a Platform Family Certificate that comprises cryptographic parameters e, n, u, P, Z, W, the security relevant information of the platform family, and the name of the device manufacturer (block 410). In one embodiment, the parameters u and P would not both be included since given n and one of these parameters, the other can be computed by $P=u*n+1$. In one embodiment, the device manufacturer uses the same cryptographic parameters e, n, u, P, W for several different platform families, and just varies the value Z for the different platforms. In this case, the values of Z may be chosen to differ by approximately or at least 4W, although the selected difference is a design choice.

Once the Platform Family Certificate is generated, the device manufacturer provides the Platform Family Certificate to the platforms or devices it manufactures which belong to that particular platform family (block 412). The distribution of cryptographic parameters associated with the Platform Family Certificate from a prover (e.g., second platform 200 in FIG. 1) to a verifier may be accomplished in a number of ways. However, these cryptographic parameters should be distributed to the verifier in such a way that the verifier is convinced that the Platform Family Certificate was generated by the device manufacturer.

For instance, one accepted method is by distributing the parameters directly to the verifier. Another accepted method is by distributing the Platform Family Certificate signed by a certifying authority, being the device manufacturer as one example. In this latter method, the public key of the certifying authority should be distributed to the verifier, and the signed Platform Family Certificate can be given to each platform member in the platform family (prover platform). The prover platform can then provide the signed Platform Family Certificate to the verifier.

Figure 4:
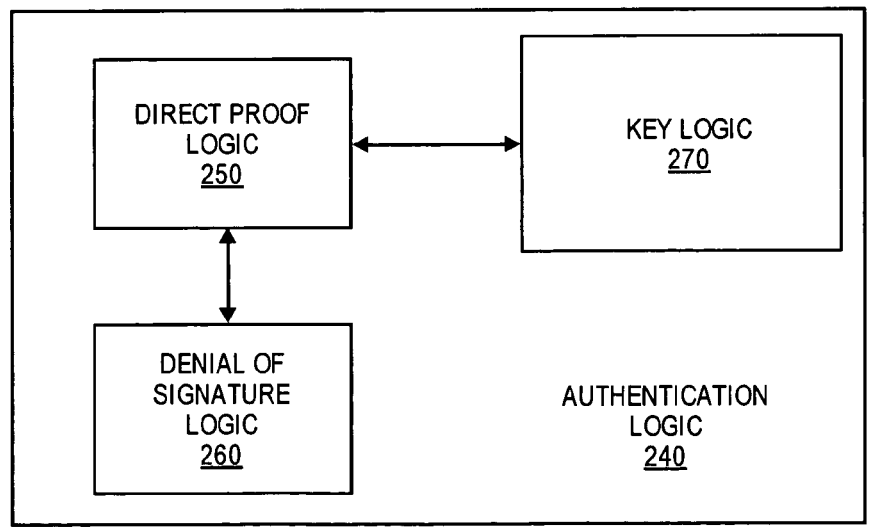
FIG. 4 illustrates an exemplary embodiment of a computer implemented with the TMP of FIG. 2.

FIG. 6 is a flowchart illustrating a method 500 for the setup performed for a prover platform manufactured according to one embodiment, such as, for example, by key logic 270, as shown in FIG. 4. The TPM of the prover platform chooses a random number F such that $0<F-Z<W$ (block 502). The TPM may blind this random number F before sending it to the certifying manufacturer for signature (block 504). This blinding operation is performed to obfuscate the exact contents of the random number F from the certifying manufacturer. In one embodiment, the TPM chooses a random value, B, where $1<B<n-1$ (block 506), and computes $A=B^e$ mod n (block 508). Then, the TPM computes $F'=F*A$ mod n (block 510). If the TPM does not blind F, then the TPM uses $F'=F$ and $A=1$ (block 512).

After performing these computations, TPM sends F' to the certifying manufacturer (block 514). The certifying manufacturer computes $c'=F'^d$ mod n (block 516), and provides c' to the prover (block 518). The TPM of the prover computes $c=c'*B^{-1}$ mod n (block 520). Notice that this implies that $c=F^d$ mod n. The values c and F are then stored in the TPM or external storage within the prover (block 522). As described herein, F is referred to as a signature key of the TPM, whereas the secret pair c,F are referred to as cryptographic information and may also be referred to herein as a "member key". As described herein, F may be referred to as the "pseudonym exponent".

Operation of the TPM to perform a direct proof to convince a verifier that the hardware device possesses cryptographic information from a certifying manufacturer is described within co-pending U.S. application Ser. No. 10/675,165, filed Sep. 30, 2003. In the Direct Proof scheme, the prover's signature used in a direct proof ("direct proof signature") is validated using a public key if the platform manufacturer (issuer). Thus all members can have their signatures validated using the same public key. It can be proven that a direct proof signature created by a member does not identify which member created the direct proof signature.

To prove to a verifier that the TPM contains a unique secret pair, the TPM may obtain a value for B to use as a base according to the random base option. For example, the TPM may compute $k=B^F$ mod N and give B,k to the verifier in response to a signature request. Accordingly, as described herein, the value k is referred to as the "pseudonym" for the direct proof signature and B is referred to as the "base" for the direct proof signature. The TPM then constructs a direct proof signature, which is a proof that the TPM possesses F,c, such that $F=c^e$ mod n and $k=B^F$ mod P, without revealing any additional information about F and c. A method for constructing a direct proof signature is given in co-pending U.S. application Ser. No. 10/306,336, which is also owned by the assignee of the present application. TPM may use different B values each time the TPM creates a new direct proof signature so that the verifiers may not know that they received the proof from the same TPM according to the random base option.

Referring again to FIG. 4, in one embodiment, TPM 220 includes denial of signature logic 260 to handle revocation member keys. The member keys are held in hardware, but it is possible that the keys can be removed. In this case, verifiers would revoke any removed key and quit accepting direct proof signatures generated with a revoked (unknown suspect) key. As a part of the signature process, the member selects a random base B and a public key (e,n) of a certifying member to compute $k=B^F$ mod P. The values of B and k are revealed as part of the signature. It is proven that if random bases are used, then given two different signatures, it is computationally infeasible to determine whether the two signatures were created with the same pseudonym exponent, F or different pseudonym exponents, F's.

However, if adversaries have removed the secret pseudonym exponents F's from some number of hardware devices, (say F1, F2, F3) and if a verifier has these pseudonym exponents, then the verifier can tell if a given signature was created using one of these pseudonym exponents, by checking whether $K=B^{F1}$ mod P or $B^{F2}$ mod P or $B^{F3}$ mod P. This works for the case where the verifier has the secret F's that were removed from the hardware device. But it does not work in the case where the verifier suspects that a member key has been removed from a hardware device, but he does not have the member key, specifically the exponent F.

To give the verifier the ability to revoke a member key that he suspects is compromised, the Direct Proof methods support the named base option. In one embodiment, according to the named base option, the verifier would provide the base B, which in one embodiment, is derived from the name of the verifier. The member would use this base B in the Direct Proof signature instead of picking a random B. As long as the verifier was using the same base, the verifier could tell if two signatures sent to him used the same pseudonym exponent, F, because the two signatures would produce the same pseudonym, $B^F$ mod P.

Thus if a verifier, using the named base option, received a direct proof signature, and suspected that the member key used to create that signature had been compromised, the verifier would be able to reject further signatures by this member key as long as he was using the same named base. However, the only way for a verifier to make effective use of the named base option is to use the same named base for a long time. This is not ideal from a privacy perspective, since it enables a verifier to link all of the transactions performed by a member with the verifier's named base.

Figure 7:
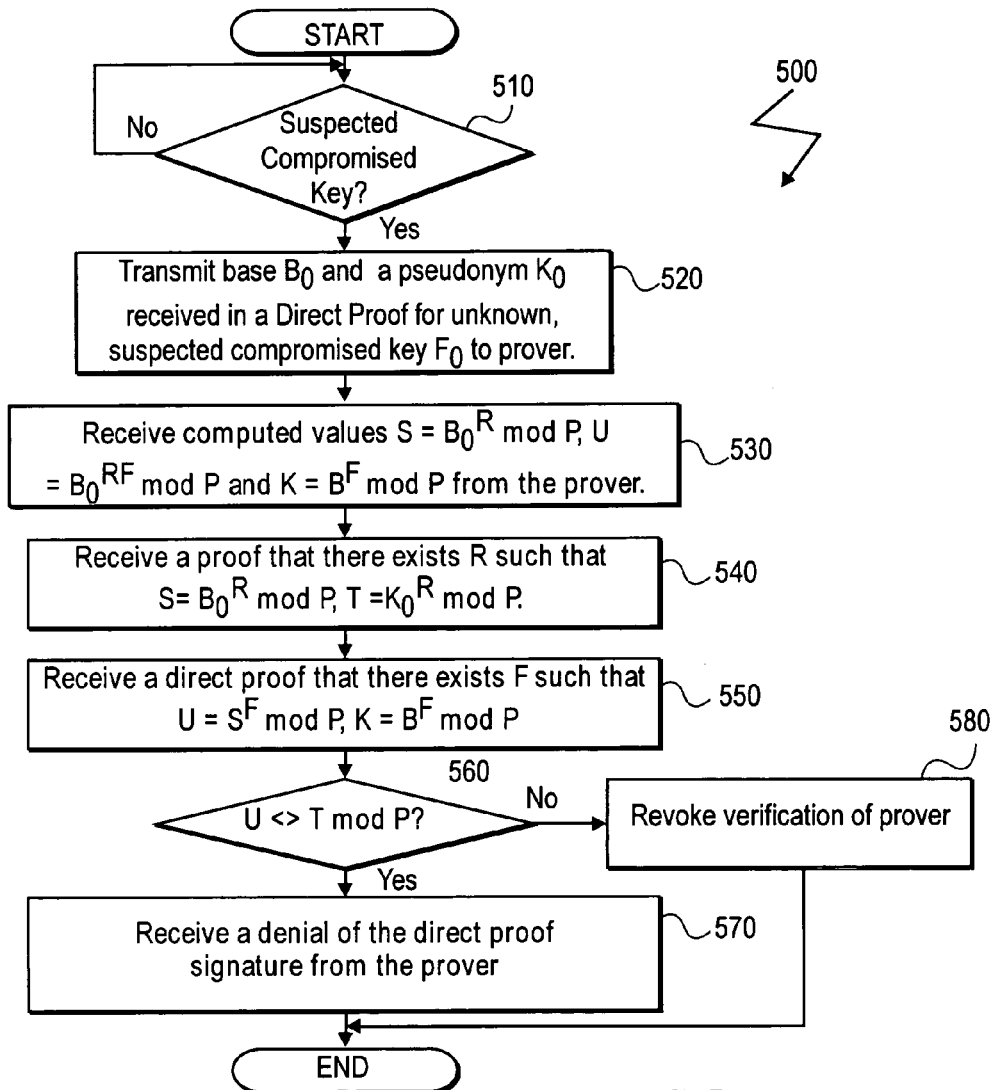
FIG. 7 is a flowchart illustrating a method for verifying that a cryptographic key stored within a trusted hardware device is uncompromised, in accordance with one embodiment.

FIG. 7 is a flowchart illustrating a method 500 performed by a verifier platform in order to verify that a cryptographic key stored within a TPM is uncompromised, in accordance with one embodiment. Representatively, at process block 510, the verifier platform determines whether it is aware of a suspect direct proof signature generated with an unknown suspect key. Suppose that the verifier platform is aware of some suspect direct proof signatures, generated with unknown suspect keys. Let $B_0$ be the base and $K_0$ be the pseudonym that was received in one of the suspect direct proof signatures. In one embodiment, the verifier platform repeats the process described below for each suspect direct proof signature.

In the embodiments described, the verifier platform does not contain a copy of the suspect key $F_0$ that had been used to compute $K_0=B_0^{F0}$ mod P. Accordingly, at process block 520, verifier platform transmits base $B_0$ and a pseudonym $K_0$ of a suspect direct proof signature, generated with the unknown, suspect key $F_0$. In response, verifier platform will receive one or more values from prover platform, computed using $B_0$ and $K_0$.

In one embodiment, validation of the cryptographic key stored within prover platform is formed as illustrated with reference to process blocks 540-560. The prover platform will generate a random value R. In one embodiment, the random value R is chosen in some specified interval, such as the interval between 0 and W. At process block 540, verifier platform receives the values S and T and a proof from prover platform that there exists a value R such that:

$$S=B_0^R \text{ mod P and } T=K_0^R \text{ mod P}. \tag{1}$$

In one embodiment, the received proof of the existence of the value R is in the form of a zero knowledge proof. One embodiment of such a zero knowledge proof for proving that two pairs $(S,B_0)$ and $(T, K_0)$ have the same discrete logarithm is given in FIG. 8. At process block 550, a verifier platform receives a proof that there exists a value F such that:

$$U=S^F \text{ mod P and } K=B^F \text{ mod P}. \tag{2}$$

Again, the proof of the existence of the value F may be performed using a zero knowledge proof. One embodiment of such a zero knowledge proof for proving that two pairs (U,S) and (K,B) have the same discrete logarithm is given in FIG. 8.

Accordingly, once verifier platform is convinced of the existence of values R and F, in one embodiment, verifier platform checks the values of U and T. If U=T mod P, then the verifier knows that prover platform key, F was equal to the unknown, suspect key, $F_0$. If:

$$U \neq T \bmod P \quad (3)$$

then the verifier knows that prover platform key, F, was not equal to the unknown, suspect key, $F_0$. This is easily seen since $B_0^{RF}=S^F=U \bmod P$ and $B_0^{RF0}=K_0^R=T \bmod P$. Thus U=T mod P if and only if $F=F_0$ mod n.

If U≠T mod P, prover platform key F is not equal to unknown, suspect key $F_0$. Accordingly, at process block 570, the verifier receives a denial that the prover signature key F was used to generate the suspect direct proof signature, referred to herein as "proving the denial of a direct proof signature". Otherwise, U=T mod P, the verifier platform receives confirmation that the prover platform was indeed using the compromised key $F_0$ for the direct proof signature.

In one embodiment, the prover platform denies the signature key F of the prover was used to form the suspect, direct proof signature by using a standard zero knowledge proof. As described herein, the standard zero knowledge proof for proving that two pairs have the same discrete logarithm is provided as follows. Specifically, given a set of integers $k_1, h_1, k_2, h_2$, and a modulus P, the zero knowledge proof will prove that there exists an e such that $k_1=h_1^f \bmod k_2$ and $h_2^f=W^e \bmod P$ without revealing any information about f.

Figure 8:
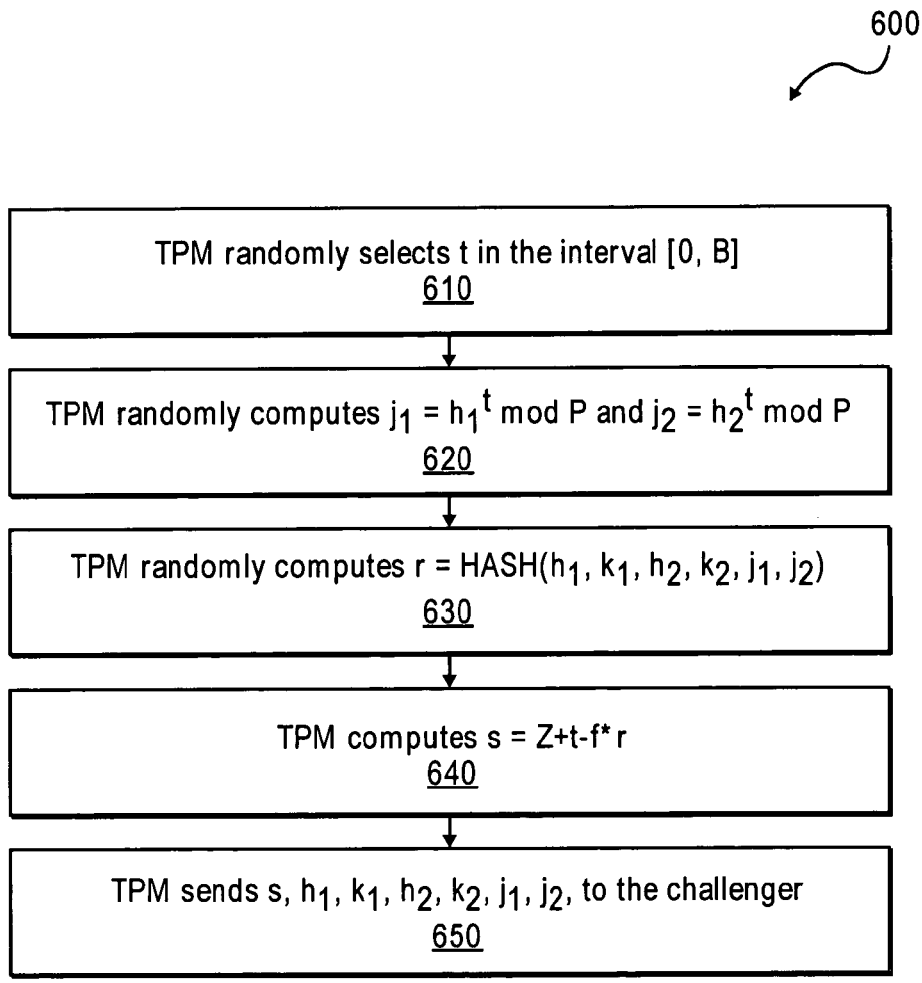
FIG. 8 is a flowchart illustrating a method for a zero knowledge proof to show that two discrete logarithms are the same, in accordance with one embodiment.

In one embodiment of a zero knowledge proof to show that two discrete logarithms are the same was given in co-pending U.S. application Ser. No. 10/306,336, which is also owned by the assignee of the present application. FIG. 8 is a flow diagram 600 illustrating this zero knowledge proof. Suppose that f is in the interval between Z and Z+W. (Z could be 0, as in the case of equation 1 above.) Let $B=W*2^{Sp+HASH\_Length}$, where Sp is a security parameter and HASH_length is the length in bits of the output of the Hash function HASH. In one embodiment Sp is chosen large enough, for example Sp=60, so that the values of s computed below do not reveal useful information about f.

At process block 610, TPM randomly selects value t in the interval [0, B]. TPM may then compute $j_1=h_1^t \bmod P$ and $j_2=h_2^t \bmod P$ at process block 620. TPM may then computer $r=HASH(h_1, k_1, h_2, k_2, j_1, j_2)$ at process block 630. At process block 640, TPM may compute s=Z+t−f*r. Finally, at process block 650, TPM may send s, $h_1, k_1, h_2, k_2, j_1, j_2$ to the verifier. According to one embodiment, the verifier may then verify the proof.

Figure 9:
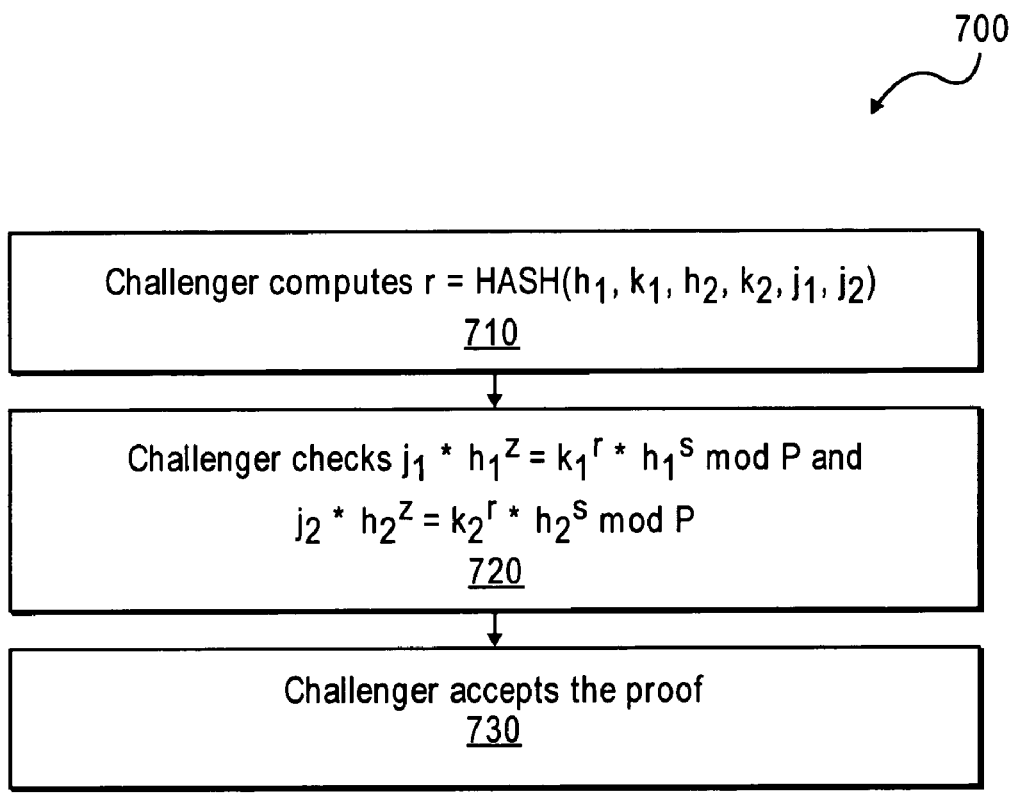
FIG. 9 is a flowchart illustrating a method for conceptually illustrating the verification of a proof that two discrete logarithms are the same, in accordance with one embodiment.

FIG. 9 is a flow diagram 700 conceptually illustrating the verification of a proof that two discrete logarithms are the same, according to one embodiment. At process block 710, the challenger may compute $r=HASH(h_1, k_1, h_2, k_2, j_1, j_2)$. The challenger may then check that $j_1*h_1^z=k_1^{r}*h_1^s \bmod P$ and $j_2*h_2^z=k_2^{r}*h_2^s \bmod P$ at process block 720. If the checks of process block 720 pass, the challenger may accept the proof at process block 730.

Figure 10:
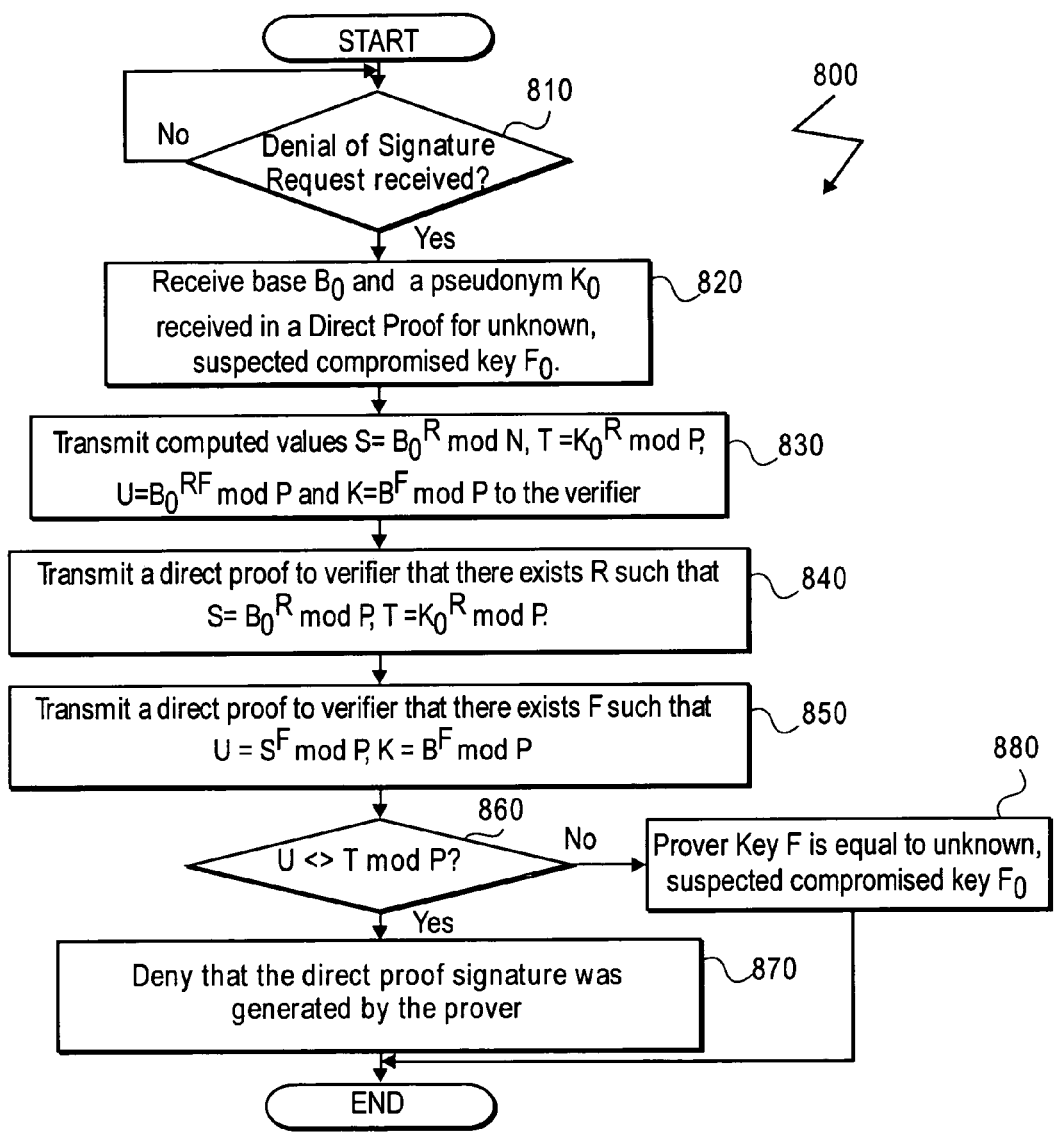
FIG. 10 is a flowchart illustrating a method for convincing a verifier that a cryptographic key stored within a trusted hardware device is uncompromised, in accordance with one embodiment.

FIG. 10 is a flowchart illustrating a method 600 performed by a prover platform in response to receipt of a key validation request. As described herein, a verifier platform, once convinced of the existence of a cryptographic key stored within hardware device may verify that the stored cryptographic key is uncompromised. In accordance with one embodiment, such functionality is provided by key validation logic 260 of authentication logic 240 of TPM 220, as illustrated with references to FIGS. 2 and 3. Representatively, at process block 810, prover platform determines whether a denial of signature request is received. Once received, the functionality of process blocks 620-670 is performed.

At process block 820, verifier platform receives base $B_0$ and a pseudonym $K_0$ of a suspect signature received in a proof (suspect direct proof signature) for unknown, suspect key $F_0$. At process block 830, prover platform transmits computed values $S=B_0^R \bmod P$, $T=K_0^R \bmod P$, $U=B_0^{RF} \bmod P$ and $K=B^F \bmod P$ to the verifier. At process block 840, prover transmits a proof to verifier platform that there exists a value R such that $S=B_0^R \bmod P$ and $T=K_0^R \bmod P$. At process block 850, prover platform transmits a direct proof to verifier platform to convince verifier platform that there exists F such that $U=S^F \bmod P$ and $K=B^F \bmod P$.

As indicated above, in one embodiment, the proofs are performed according to the zero knowledge proof as described in FIG. 8. As also indicated above, assuming that Equation (3) evaluates to true, at process block 860, prover key F is not equal to unknown, suspect key $F_0$ and process block 870 is performed. At process block 870, the prover will deny that the suspect direct proof signature was generated with a signature key F of the prover platform. Otherwise, if Equation (3) evaluates to false, prover key F is equal to unknown, suspect key $F_0$. As a result, the prover platform would fail to prove denial of the suspect direct proof signature. Accordingly, verifier platform would fail to authenticate prover platform, since prover platform is using a compromised key.

Accordingly, one embodiment provides enhanced security capabilities to the named based option described above. However, in one embodiment, a verifier platform is prohibited from submitting to prover platforms all signatures previously received. Namely, by submitting all previously received signatures to a prover platform, a prover platform that had previously submitted a signature would be required to identify the respective signature. As a result, the verifier platform would be able to link all previous signatures from the prover platform together. In one embodiment, several methods are provided to prevent abuse of the revocation capability described by one or more embodiments herein.

In one embodiment, a prover platform is provided with a built-in capability to limit the number of signatures that the verifier can present for denial. This is a reasonable method since a very small percentage of devices will be compromised and have their keys removed. However, if more than the limit get compromised, in one embodiment, devices may be rekeyed. A device would be rekeyed only after the device had proven that it was not a compromised device. Another method is to put into the device one or more public keys (hashes of public keys) of revocation authorities. Accordingly, a verifier platform would give a denial of signature if the request for denial was approved by one of these revocation authorities. The approval could be indicated by having the revocation authority sign the request for denial, specifically to sign the pair $(B_0, K_0)$.

In an alternate method, when a verifier asks for a signature, he gives a revocation identifier. In one embodiment, when a member is presented with a revocation identifier, the prover platform will limit signature denial to requests, including the same revocation identifier. The revocation identifier could be indicated by the low order bits of the value of B, for instance, the low order 40 bits. The verifier would indicate these low order bits of B, and the prover would use these low order bits of B, and select the rest of the bits of B randomly. The prover would then only provide a denial for signatures in which the $B_0$ matched these low order bits. In this way, verifier platforms could be placed into groups where two verifiers are in the same group if they used the same revocation identifier. Within a group, a verifier could tell other verifiers to reject a member key, but they could not tell verifiers outside the group to reject the member key. In one embodiment, this method may also include a limit on the number of issued denial of signature requests.

The previous application also includes a non-interactive method for Direct Proof. In addition, there have been other methods discovered for performing Direct Proof. One of these was presented by Brickell, Boneh, Chen, and Shacham and was called set signatures. Another was presented by Brickell, Camenisch, and Chen and was called Direct Anonymous Attestation. All of these methods share the property that there is a random base option such that in the creation of the signature or the interactive proof, the member creates a pseudonym, $k=B_f$ in some finite group, such as the integers modulo Q for some integer Q. Thus, the method described in this invention for proving the denial of a signature can be applied to any of these signature or interactive methods as well.

Having disclosed exemplary embodiments and the best mode, modifications and variations may be made to the disclosed embodiments while remaining within the scope of the embodiments of the invention as defined by the following claims.

What is claimed is:

1. A method comprising:
convincing a verifier that an anonymous hardware device possesses cryptographic information without disclosure of the cryptographic information to the verifier;
receiving a denial of signature request, including a base value $B_0$ and a pseudonym value $K_0$ of a suspect signature from the verifier;
convincing the verifier that a cryptographic key, F, stored within the anonymous hardware device and used to construct a pseudonym, K, does not match an unknown, suspect key $F_0$ used to form the suspect signature, to prove to the verifier that the cryptographic key, F, stored within the anonymous hardware device is uncompromised without disclosure of the cryptographic key or any unique device identification information of the hardware device to the verifier to enable the hardware device to remain anonymous to the verifier.

2. The method of claim 1, wherein convincing the verifier that the hardware device possesses the cryptographic information comprises:
performing a direct proof by the hardware device to prove that the cryptographic key is stored within the hardware device, the direct proof comprising a plurality of exponentiations, at least one being conducted using the cryptographic key of the hardware device as an exponent without exposing the cryptographic key.

3. The method of claim 1, wherein convincing a verifier that a hardware device possesses cryptographic information comprises:
using the cryptographic information to compute a pseudonym, K; and
providing the pseudonym, K, to the verifier.

4. The method of claim 1, wherein convincing the verifier that the cryptographic key is uncompromised comprises:
selecting a random exponent value R;
transmitting one or more computed values to the verifier according to a suspect-base value $B_0$ and a suspect pseudonym value $K_0$ received from the verifier, a modulus value P of the hardware device and a random exponent value R selected by the hardware device in response to;
performing a proof by the hardware device to deny that a cryptographic key F stored within the hardware device was used to create a suspect direct proof signature, the proof comprising a plurality of exponentiations, each being conducted using one of the cryptographic key, F, the random exponent value R and other random exponent values as an exponent without exposing the cryptographic key, F, the random exponent value R and the other random exponent values.

5. The method of claim 4, wherein performing the proof comprises:
convincing the verifier that the value R exists such that:

$S=B_0^R \bmod P$ and $T=K_0^R \bmod P$, without revealing any useful information about R; and
convincing the verifier that a value F exists such that:

$U=S^F \bmod P$ and $K=B^F \bmod P$, without revealing any useful information about F.

6. The method of claim 4, wherein the verifier is convinced that the cryptographic key F stored within the hardware device was not used to create the suspect direct proof signature if $U \approx T \bmod P$.

7. The method of claim 1, wherein convincing the verifier that the cryptographic key is uncompromised comprises:
receiving a denial of signature request, including a suspect base value $B_0$ and a suspect pseudonym value $K_0$ of a suspect signature from the verifier;
receiving a revocation identifier associated with the suspect signature as a suspect revocation identifier; and
performing a direct proof by the hardware device to deny that the cryptographic key F stored within the hardware device matches the unknown suspect key $F_0$ if the suspect revocation identifier matches a revocation identifier received with a signature request from the verifier.

8. The method of claim 1, wherein convincing the verifier that the cryptographic key is uncompromised comprises:
(a) receiving a denial of signature request from the verifier, including at least one suspect direct proof signature;
(b) determining whether the request for the denial of signature has been approved by a predetermined revocation authority according to one or more public keys of one or more revocation authorities stored within the hardware device; and
(c) performing a direct proof to deny that the cryptographic key stored within the hardware device was used in a direct proof with the verifier to form the suspect direct proof signature, if the request was signed by a predetermined revocation authority.

9. The method of claim 7, further comprising:
repeating (a)-(c) for a plurality of suspect direct proof signatures; and
if the plurality of suspect direct proof signatures exceeds a suspect direct proof signature limit value, notifying the verifier that the verifier has exceeded the suspect direct proof signature limit value.

10. A method, comprising:
verifying that an anonymous hardware device possesses cryptographic information without determining the cryptographic information of the hardware device; and
verifying that a cryptographic key of the hardware device was not used to generate at least one suspect signature held by a verifier to prove to the verifier that the cryptographic key of the anonymous hardware device is uncompromised, where a suspect key used to generate the suspect signature is unknown to the verifiers without determining the cryptographic key or any unique device identification information of the hardware device to enable the hardware device to remain anonymous to the verifier.

11. The method of claim 10, wherein prior to verifying that the hardware device possesses cryptographic information, the method comprises:
detecting compromised content of the verifier;
determining a base $B_0$ and a pseudonym $K_0$ of a suspect direct proof signature used to receive the compromised content; and
storing the $B_0$ and a pseudonym $K_0$ as a suspect direct proof signature generated with an unknown, suspect key $F_0$.

12. The method of claim 10, wherein verifying that the hardware device possesses cryptographic information comprises:
receiving a proof from the hardware device to verify that a cryptographic key is stored within the hardware device, the proof comprising a plurality of exponentiations, at least one being conducted using the cryptographic key as an exponent without exposing the cryptographic key.

13. The method of claim 10, wherein verifying the hardware device possesses cryptographic information comprises:
computing, by the hardware device, a pseudonym, K, using the cryptographic key; and receiving the pseudonym, K, from the hardware device.

14. The method of claim 13, wherein verifying that the cryptographic key was not used to generate the suspect signature comprises:
providing the hardware device with a denial of signature request, including a base $B_0$ and a pseudonym $K_0$ of a suspect direct proof signature generated with an unknown, suspect key $F_0$, the base $B_0$ and pseudonym $K_0$ having an associated revocation identifier; and
receiving a direct proof from the hardware device to convince the verifier that a cryptographic key F of the hardware device used to construct the pseudonym, K, does not match the suspect compromised key $F_0$ if a revocation identifier provided to the hardware device during a digital signature request matches a revocation identifier associated with the suspect direct proof signature.

15. The method of claim 10, wherein verifying that the cryptographic key was not used to generate the suspect signature comprises:
(a) providing the hardware device with a denial of signature request including a base $B_0$ and a pseudonym $K_0$ of a suspect signature formed with an unknown suspect key $F_0$;
(b) verifying that a cryptographic key F of the hardware device does not match the suspect compromised key $F_0$ without identification of the cryptographic key F of the hardware device.

16. The method of claim 15, wherein verifying further comprises:
receiving a proof from the hardware device that a value R exists such that:

$S=B_0^R \mod P$ and $T=K_0^R \mod P$, without identification of any useful information about R;
receiving a proof from the hardware device that a value F exists such that:

$U=S^F \mod P$ and $K=B^F \mod P$, without identification of any useful information about F; and identifying the cryptographic key F of the hardware device as uncompromised if $U \approx T \mod P$.

17. The method of claim 16, further comprising:
identifying the cryptographic key F of the hardware device as compromised if $U=T \mod P$.

18. The method of claim 15, further comprising:
repeating (a) and (b) for a predetermined number of suspect direct proof signatures; and
if the predetermined number exceeds a suspect direct proof signature limit value, rekeying hardware devices that are members of a platform family defined by a certifying manufacturer of the hardware device.

19. The method of claim 10, wherein verifying that the hardware device possesses cryptographic information comprises:
transmitting a signature request to the hardware device, including a revocation identifier of a verifier of the hardware device;
receiving a digital signature of the hardware device, including the revocation identifier; and
authenticating the digital signature of the hardware device according to a public key of a manufacturer of the hardware device.

20. An anonymous hardware device, comprising:
a flash memory to store cryptographic information from a certifying manufacturer; and
a trusted platform module to convince a verifier that the anonymous hardware device possesses cryptographic information from a certifying manufacturer without disclosure of the cryptographic information to the verifier, and to convince the verifier that a cryptographic key, stored within the flash memory, is uncompromised without disclosure of the cryptographic key or any unique device identification information of the hardware device to the verifier to enable the hardware device to remain anonymous to the verifier; and
denial of signature logic to receive a denial of sinnature request, including a base value $B_0$ and a pseudonym value $K_0$ of a suspect signature from the verifier and to convince the verifier that the cryptographic key stored within the hardware device and used to construct a pseudonym. K, does not match an unknown, suspect key $F_0$ used to form the suspect signature.

21. The anonymous hardware device of claim 20, wherein the trusted platform module comprises:
authentication logic to prove that the cryptographic key is stored within the hardware device according to a direct proof comprising a plurality of exponentiations, at least one being conducted using the cryptographic key as an exponent without exposing the cryptographic key.

22. The anonymous hardware device of claim 20, wherein the trusted platform module comprises:
key logic to receive a unique secret pair (c,F) from a certifying manufacturer of the apparatus where F is a signature key of the hardware device of the form $c^e \mod P$, where the pair (e, P) is a public key of the certifying manufacturer.

23. The anonymous hardware device of claim 22, wherein the trusted platform module comprises:
a flash memory to store the unique, secret pair (c,F).

24. A system, comprising:
a verifier platform coupled to a network; and
an anonymous prover platform coupled to the network, comprising:
a bus,
a processor coupled to the bus, a chipset coupled to the bus, including a trusted platform module, in response to a challenge received over the network, the trusted platform module to convince the verifier platform that the anonymous prover platform device possesses cryptographic information without disclosure of the cryptographic information to the verifier platform and to convince the verifier that a cryptographic key stored within the anonymous prover platform is uncompromised without disclosure of the cryptographic key or any unique device identification information of the anonymous prover platform to the verifier to enable the prover platform to remain anonymous to the verifier platform, and denial of signature logic to receive a denial of signature reiuest, including a base value $B_0$ and a pseudonym value $K_0$ of a suspect signature from the verifier platform, and to convince the verifier platform that a cryptographic key F stored within the anonymous prover platform used to compute a pseudonym, K, does not match an unknown, suspect key $F_0$ used to form the suspect signature.

25. The system of claim 24, wherein the chipset comprises a graphics controller.

26. The system of claim 24, wherein the network comprises a wide area network work.

27. The system of claim 24, wherein the trusted platform module comprises:

key logic to receive a unique secret pair (c,F) from a certifying manufacturer of the apparatus where F is a signature key of the hardware device of the form $c^e$ mod P, where the pair (e, P) is a public key of the certifying manufacturer; and a flash memory to store the unique, secret pair (c,F).

28. An article of manufacture including a machine readable medium having stored thereon instructions which use to program a system to perform a method, comprising:

convincing a verifier that an anonymous hardware device possesses cryptographic information without disclosure of the cryptographic information to the verifier;

receiving a denial of signature reciuest, including a base value $B_0$ and a pseudonym value $K_0$ of a suspect signature from the verifier;

convincing the verifier that a cryptographic key, F, stored within the hardware device and used to construct a pseudonym, K, does not match an unknown, suspect key $F_0$ used to form the suspect signature, to prove to the verifier that the cryptographic key, F, stored within the anonymous hardware device is uncompromised without disclosure of the cryptographic key or any unique device identification information of the hardware device to the verifier to enable the hardware device to remain anonymous to the verifier.

29. The article of manufacture of claim 28, wherein convincing a verifier that a hardware device possesses cryptographic information comprises:

using the cryptographic information to compute a pseudonym, K; and providing that pseudonym, K, to the verifier.

30. The article of manufacture of claim 28, wherein convincing the verifier that the cryptographic key does not match the unknown, compromised key $F_0$ comprises:

selecting a random exponent value R;

transmitting one or more computed values to the verifier according to the suspect-base value $B_0$ and the suspect pseudonym value $K_0$ received from the verifier, a modulus value P of the hardware device and the random exponent value R;

performing a proof by the hardware device to deny that the cryptographic key F stored within the hardware device was used to create a direct proof suspect signature, the proof comprising a plurality of exponentiations, each being conducted using one of the cryptographic key, F, the random exponent value R and other exponent values as an exponent without exposing the cryptographic key, the random exponent value R and the other exponent values.

31. The article of manufacture of claim 30, wherein performing the proof comprises:

convincing the verifier that the value R exists such that:

$S=B_0^R$ mod P and $T=K_0^R$ mod P, without revealing any useful information about R; and convincing the verifier that a value F exists such that:

$U=S^F$ mod P and $K=B^F$ mod P, without revealing any useful information about F.

32. The article of manufacture of claim 31, wherein the verifier is convinced that the cryptographic key F stored within the hardware device was not used to create the suspect direct proof signature if $U \neq T$ mod P.

33. An article of manufacture including a machine readable medium having stored thereon instructions which use to program a system to perform a method, comprising:

verifying that an anonymous hardware device possesses cryptographic information without determining the cryptographic information of the hardware device; and verifying that a cryptographic key of the hardware device was not used to generate at least one suspect signature held by a verifier, to prove that the cryptographic key of the verifier is uncompromised, where a suspect key used to generate the suspect signature is unknown to the verifier, without disclosure of the cryptographic key or any unique device identification information of the hardware device to the verifier to enable the hardware device to remain anonymous to the verifier.

34. The article of manufacture of claim 33, wherein verifying that the hardware device possesses cryptographic information comprises:

receiving a proof from the hardware device to verify that a cryptographic key is stored within the hardware device, the proof comprising a plurality of exponentiations, at least one being conducted using the cryptographic key as an exponent without exposing the cryptographic key.

35. The article of manufacture of claim 33, wherein verifying that the cryptographic key was not used to generate the suspect signature comprises:

(a) providing the hardware device with a denial of signature request including a base $B_0$ and a pseudonym $K_0$ of a suspect direct proof signature formed with an unknown suspect key $F_0$;

(b) verifying that a cryptographic key F of the hardware device does not match the suspect compromised key $F_0$ without identification of the cryptographic key F of the hardware device.

36. The article of manufacture of claim 35, wherein verifying further comprises:

receiving a direct proof from the hardware device that a value R exists such that:

$S=B_0^R$ mod P and $T=K_0^R$ mod P, without identification of any useful information about R;

receiving a direct proof from the hardware device that a value F exists such that:

$U=S^F$ mod P and $K=B^F$ mod P, without identification of any useful information about F; and identifying the cryptographic key of the hardware device as uncompromised if U≠T mod P.

37. The article of manufacture of claim 36, further comprising:

identifying the cryptographic key F of the hardware device as compromised if U=T mod P.

38. A method comprising:

convincing a verifier that an anonymous hardware devices possesses cryptographic information without disclosure of the cryptographic information the verifier; and convincing a verifier that a cryptographic key of the anonymous hardware device was not used to generate at least one suspect signature held by a verifier, where a suspect key used to generate the suspect signature is unknown to the verifier, to prove to the verifier that the cryptographic key is uncompromised, without disclosure of the cryptographic key or any unique device identification information of the hardware device to the verifier to enable the hardware device to remain anonymous to the verifier.

39. A method comprising:

convincing a verifier that an anonymous hardware device possesses cryptographic information without disclosure of the cryptographic information to the verifier;

transmitting one or more computed values to the verifier according to a suspect-base value $B_0$ and a suspect pseudonym value $K_0$ received from the verifier, a modulus value P of the hardware device and a random exponent value R selected by the hardware device in response to a denial of signature request, including the base value $B_0$ and the pseudonym value $K_0$ of the suspect signature from the verifier; and performing a proof by the hardware device to deny that a cryptographic key, F, stored within the hardware device was used to create a suspect direct proof signature prove to the verifier that the cryptographic key stored within the anonymous hardware device is uncompromised, without disclosure of the cryptographic key or any unique device identification information of the hardware device to the verifier to enable the hardware device to remain anonymous to the verifier, the proof comprising a plurality of exponentiations, each being conducted using one of the cryptographic key, F, the random exponent value R and other random exponent values as an exponent without exposing the cryptographic key, F, the random exponent value R and the other random exponent values.

* * * * *

UNITED STATES PATENT AND TRADEMARK OFFICE
CERTIFICATE OF CORRECTION

PATENT NO.         : 7,490,070 B2                                    Page 1 of 1
APPLICATION NO. : 10/866252
DATED              : February 10, 2009
INVENTOR(S)        : Brickell et al.

It is certified that error appears in the above-identified patent and that said Letters Patent is hereby corrected as shown below:

In column 14, at line 37, delete "sinnature" and insert --signature--.

In column 15, at line 15, delete "reiuest" and insert --request--.

In column 15, at line 40, delete "reciuest" and insert --request--.

Signed and Sealed this

Sixth Day of April, 2010

David J. Kappos
*Director of the United States Patent and Trademark Office*